United States Patent Office 3,160,569
Patented Dec. 8, 1964

3,160,569
METHOD OF REMOVING SEED COATS OF SOYBEANS WITH CELLULASE PRODUCED BY MICROORGANISMS
Nobuo Toyama, Miyazaki-ken, Japan, assignor to Kinki Yakult Seizo Kabushiki Kaisha, Takarazuka-shi, and Meiji Seika Kaisha, Ltd., Tokyo, Japan, both corporations of Japan
No Drawing. Filed Feb. 21, 1962, Ser. No. 174,723
Claims priority, application Japan Feb. 23, 1961
5 Claims. (Cl. 195—2)

This invention relates to a method of removing seed coats of soybeans and defatted soybeans with cellulase produced by microorganisms.

An object of the present invention is to obtain soybeans and defatted soybeans in which extremely fewer seed coats are mixed than in those obtained by any conventional mechanical method by utilizing cellulase produced by microorganisms.

The seed coats of soybeans consist chiefly of cellulose and hemicellulose. Therefore, the rate of digestion of soybeans is so low that special contrivances have been made to make soybeans edible. A method of mechanically removing the seed coats of soybeans is most used as one of such contrivances. Soybean protein is at present an important protein source in foodstuff. For example, a protein food has been produced by refining defatted soybeans. In this case, the seed coats would be removed by a mechanical method and the separation of the seed coats will be so incomplete that a part of the seed coats will be mixed in the product and no satisfactory quality will be expected.

The product mixed with seed coats will be so low in the rate of digestion that the quality of the food will be reduced.

If the seed coats of soybeans or defatted soybeans are decomposed and removed by using cellulase produced by microorganisms or, as required, by using pectinase simultaneously with cellulase in accordance wtih the method of the present invention, there will be obtained high quality soybeans in which extremely fewer seed coats are mixed than in those obtained by the mechanical method. The facts that soybeans or defatted soybeans must be soaked in an enzyme solution and that a step of drying soybean protein may be required after the seed coats are removed is a difficulty in the method of the present invention as compared with the mechanical method. As in the method of the present invention complete removal of seed coats may be expected and, even in the mechanical method, in order to expect the complete removal of seed coats, soaking step in the enzyme solution is required, after all, the method of the present invention in which the removal of seed coats is finished in one step is superior.

The microorganisms to be used in the present invention are such cellulase-producing microorganisms as Trichoderma, Myrothecia, Penicillia, Aspergilli and Actinomycetes. The cellulase produced by these microorganisms has a property of acting on cellulose so as to decompose it into polysaccharides and glucose and acts mostly on the weakly acidic side. Its optimum pH is mostly around 3.5 to 6.5. The optimum temperature for the action of the enzyme is mostly in the range of 25 to 60° C. Further, in the present invention, in case, as required, pectinase is used simultaneously with cellulase, the pectinase will act on pectin contained in the seed coats of soybeans so as to decompose it.

The principle of the present invention is to make cellulase produced by microorganisms act on soybeans or defatted soybeans to decompose and remove their seed coats. The steps of the enzyme treatment in the present invention are as follows:

Microorganisms producing a cellulose decomposing enzyme are cultured by conventional solid or liquid culturing method to produce cellulase. An extract or filtrate containing cellulase of such culture media as it is or an enzyme solution in which cellulase is, as required, concentrated with ammonium sulphate, ethanol or acetone as in the conventional method or a solution prepared by dissolving cellulase separated and refined from any of them in such buffer solution as water or an inorganic or organic salt solution is used as an enzyme source. In using it, its pH is adjusted to be 3.5 to 6.5. To such enzyme source are added raw soybeans, air dried soybeans or defatted soybeans in such amount as will be soaked in the solution even after the soybeans expanded by absorbing the solution. An antiseptic may be added thereto as required. When the soybeans are held in the enzyme solution at a temperature of 25 to 60° C. adapted to the enzyme action for a fixed time of 2 to 24 hours and are then agitated, washed with water and shaken, the soybean seed coats consisting of a thicker outer coat and a very thin inner coat will be easily peeled off.

The present invention will be explained by way of examples as follows:

Example 1

1 kg. of bran was impregnated with 800 ml. of water, was then sterilized with steam under the normal pressure for 30 minutes and was cooled to 30° C. 20 g. of seed malt of *Tichoderma viridae* were inoculated and cultured at about 30° C. for 3 days. After the completion of the culture, 5 liters of water were added to the malt which were kept at the room temperature for 1 hour to extract enzyme. The extract was filtered to give an enzyme solution. The cellulase potency of this enzyme solution was 40 u./ml. The enzyme solution was adjusted to pH 4.0 by addition of glacial acetic acid. 1 kg. of raw soybeans was added to the enzyme solution, was held at about 40° C. for 24 hours, was then taken out of the enzyme solution and was washed with water, whereupon the seed coats of the soybeans were peeled off. The yield of the soybeans was 0.9 kg.

Example 2

550 g. of ammonium sulphate were added to 1 liter of the enzyme solution obtained by the same procedure as in Example 1. The precipitates were collected by filtration and dried at a temperature lower than 40° C. The potency of this dried enzyme was 4000 u./g. 50 g. of this dried enzyme were dissolved in 5 liters of an acetate buffer solution of pH 4.0. Then the seed coats of soybeans were removed in the same manner as in Example 1.

Example 3

Penicillium No. 927 was inoculated in bran sterilized in the same manner as in Example 1 and was cultured at 30° C. for 4 days. After the completion of the cultivation, an enzyme solution was obtained by such method as was shown in Example 1. The enzyme solution was diluted with water so that its cellulase potency might be 40 u./ml. Soybeans were treated with the enzyme solution in the same manner as in Example 1 to give soybeans free from seed coats.

Example 4

The dried enzyme obtained by the same manner as in Example 2 was dissolved in water so that its cellulase potency might be 40 u./ml. 200 g. of defatted soybeans were added to 1 liter of this enzyme solution. The solution was adjusted to pH 4.0 with glacial acetic acid. The soybeans were held in the enzyme solution at 40° C. for 24 hours and were then well washed with water, to give 160 g. of soybean cakes almost free from seed coats.

Example 5

A cellulase extract of a potency 40 u./ml. was obtained in the same manner as in Example 1. 50 g. of pectinase were added to 5 liters of this enzyme solution. When the solution was made to act at 40° C. for 10 hours in the same manner as in Example 1, soybeans free from seed coats were obtained.

I claim:

1. A method for removing seed coats from soybeans comprising, producing cellulase from cellulase-producing microorganisms, digesting soybean seed coats by contacting said cellulase with soybeans having seed coats, removing the seed coats from the soybeans.

2. The method of claim 1, wherein the soybeans have been defatted.

3. The method of claim 1, wherein the cellulase contacts the soybeans for two to twenty-four hours at a temperature of 25° to 60° C. and at a pH of 3.5 to 6.5.

4. The method of claim 1, wherein pectinase is used to contact the seed coats of the soybeans simultaneously with cellulase, in order to react with the pectin contained in the seed coats.

5. The method of claim 1, wherein the microorganisms are selected from the group consisting of Trichoderma, Myrothecia, Penicillia, Aspergilli and Actinomycetes.

References Cited in the file of this patent

UNITED STATES PATENTS

| | | |
|---|---|---|
| 2,007,693 | Ruter et al. | July 9, 1935 |
| 2,543,049 | Naghski et al. | Feb. 27, 1951 |

OTHER REFERENCES

Reese et al.: "Textiele Research Journal, vol. XXVII, No. 8, August 1957, pages 626 to 631.

Markley: "Soybeans and Soybean Products," vol. II, pages 951 to 956, Interscience Pub. Inc., New York (151).